W. ELKIN.
CARBURETER.
APPLICATION FILED OCT. 20, 1910. RENEWED JAN. 16, 1913.
1,075,635.
Patented Oct. 14, 1913.
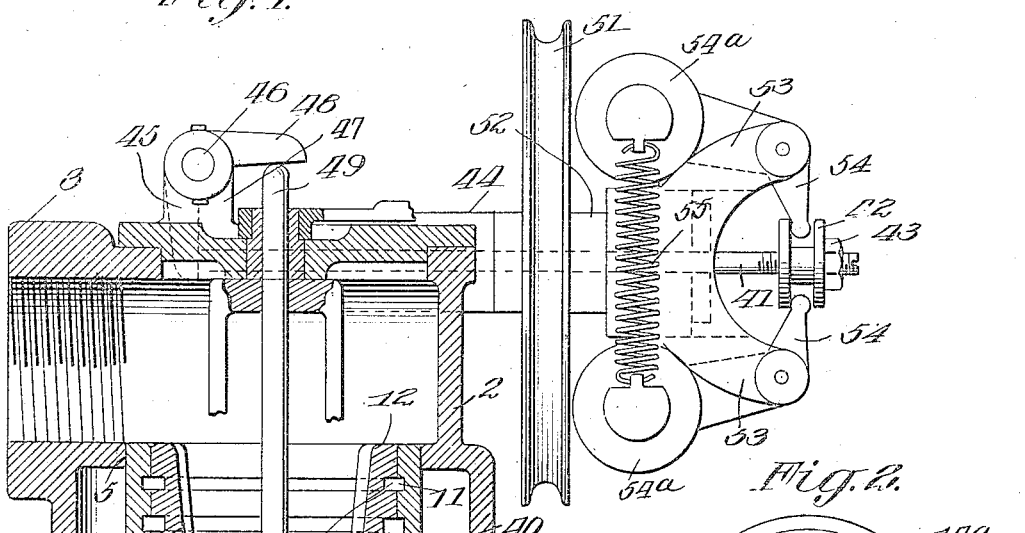
WITNESSES:
Samuel E. Wade
C. E. Trainor
INVENTOR
WARREN ELKIN
BY Munn & Co.
ATTORNEYS United States Patent Office.

WARREN ELKIN, OF WINCHESTER, KENTUCKY.

CARBURETER.

1,075,635.

Specification of Letters Patent.

Patented Oct. 14, 1913.

Application filed October 20, 1910, Serial No. 588,128. Renewed January 16, 1913. Serial No. 742,473.

*To all whom it may concern:*

Be it known that I, WARREN ELKIN, a citizen of the United States, and a resident of Winchester, county of Clark, and State of Kentucky, have invented certain new and useful Improvements in Carbureters, of which the following is a specification.

My invention is an improvement in carbureters, and consists in certain novel constructions, and combinations of parts, hereinafter described and claimed.

Referring to the drawings forming a part hereof, Figure 1 is a vertical section of the improvement. Fig. 2 is a section on the line 2—2 of Fig. 1. Fig. 3 is a side view of the shells forming the screen, and Fig. 4 is a sectional view of the lower part of the improvement at right angles to the section of Fig. 1 and on a reduced scale and with a modified form of screen.

The present embodiment of the invention comprises a main casing 1, having at each end a central circular opening 4 and 5 an annular air chamber being formed between the openings, the casing having beyond the opening 5, an extension 2, provided at one side with an internally threaded nipple 3, adapted for connection with the engine. A cylindrical valve casing 6 is arranged in the valve casing, and the said valve casing is reduced at its lower end at 7, a shoulder 8, being formed between the main portion and the reduced portion.

The valve casing is seated in the openings 4 and 5, the main portion engaging the opening 5, and the reduced portion engaging the opening 4, while the shoulder 8 is seated in a rabbet 9 encircling the opening 4. The upper end of the valve casing is open, and the lower end is closed and provided with a circular opening 10.

A plurality of annular grooves 11 is formed in the inner face of the main portion of the valve casing, the said grooves being spaced apart from each other. A cylindrical valve 12 fits within the valve casing, the lower end 13 thereof being reduced to fit within the portion 7 of the casing, and the outer surface of the valve is provided with spaced annular grooves 14, registering with the grooves 11 of the casing.

A reference to Fig. 2 will show that the grooves 11 communicate with the chamber 40, by means of slots 40$^a$, and that the grooves 14 communicate with the interior of the valve, by means of slots 14$^a$. The air is thus free to enter from the chamber 40 through the slots 40$^a$, grooves 11, 14 and slots 14$^c$ to the interior of the carbureter.

The lower end 15 of the valve is closed, and a stem 16 extends from the center thereof through the opening 10 in the bottom of the casing, and the side wall of the valve is provided with an annular series 17 of spaced slots, adjacent to the said lower end, which are adapted to register with the slots of a similar series 18 in the side wall of the casing.

An auxiliary casing 19 is arranged below the casing 1, the upper end of the casing fitting against the lower end of the casing 1, and the casings are held together by cap screws 20. The upper end of the casing 19 is provided with an opening for receiving the valve casing, and the outer faces of the upper end of the casing 19 and the lower end of the casing 1 are rabbeted as shown in Fig. 1, to receive an annular flange 21 on a bushing 22 which encircles the valve casing between the said casing and the auxiliary casing. The lower end of the bushing is rabbeted in each face as shown in Fig. 1, and concentric shells 23 and 24 of perforate material are connected with the bushing, the upper end of one shell being arranged on the outer rabbeted surface and the upper end of the other shell on the inner rabbeted surface, so that the outer face of one shell and inner face of the other is flush with the adjacent face of the bushing. The inner shell 24 is of fine mesh, as shown more clearly in Fig. 3, while the outer 23 is of course mesh, and the lower edge of the outer shell is bent inwardly at 25 into contact with the lower edge of the inner shell. The said lower edges are flush with the lower end of the valve casing and both shells cover the slots 17 and 18.

The auxiliary casing 19 is provided, directly below and in alinement with the stem 16, with an internally threaded sleeve 26 extending through the wall of the casing, and a sleeve nut 27 is threaded through the sleeve. A spring 28 is arranged within the sleeve nut, and the lower end of the stem 16 seats on the spring. The outer end of the nut is provided with a head 29 for convenience in turning the same. The casing 19 is also provided with an annular groove or passage 30 near its upper end, and with an internal annular rib 31 below the groove or passage. The inner face of the rib is spaced apart from the outer face of the shell 23 as shown to permit the excess fuel to pass downwardly over the shell. A ring 35 encircles the outer shell between the shell and the groove, and the said ring is provided with a plurality of ports 36, for permitting the access of the fuel to the slots 17—18 of the valve and casing. Adjacent to the sleeve 26, the casing 19 is provided with a lateral discharge port 32, and with a nipple 33, into which is threaded a drain pipe 34, leading to a suitable place of discharge, as for instance the supply tank or reservoir for fuel, or a well. A passage 37 is formed in the wall of the auxiliary casing 19 leading from the interior of the casing to the groove 30, and a valve 38 is threaded through the casing for controlling the said passage. A small pipe 39 is threaded into the lower end of the passage, and extends into the drain pipe.

The liquid fuel, as for instance gasolene is fed into the groove or passage 30, which is the distributing chamber, by means of a small pump, not shown, and is thrown onto the ring 35. The liquid flows, by gravity, down the ring and onto the shells, the surplus passing out of the casing 19 through the pipe 34, and through the pipe 39. The engine draws in the proper amount of fuel, through the ports 36 of the ring, and the slots 17 and 18 of the valve casing, into the interior of the valve, where it is mixed with a suitable quantity of air, from the chamber 40 of the main casing, the said air entering through the grooves 11, 14. The mixture then passes into the extension 2, and into the engine.

The valve 12 is controlled by a governor comprising a shaft 41 reciprocable in a sleeve 44 connected with the extension, to the outer end of which is secured a grooved wheel 42, by means of a nut 43, threaded on to the shaft. The inner end of the shaft bears against one arm 45 of a rock shaft 46 journaled in a bearing 47 on the extension, and having its other arm 48 bearing upon the upper end of a rod 49. The lower end of the rod rests in a seat 50 in the lower end of the valve. A pulley 51 is journaled on the shaft 41, and is connected by a belt (not shown) with a rotating part of the engine. The hub 52 of the pulley is provided adjacent to the wheel 42 with a pair of oppositely arranged arms 53, to each of which is pivoted an elbow lever 54. One arm of each lever is engaged with the annular groove of the wheel 42, and the other is provided with a weight 54ª, and the said arms are connected by a spring 55, the whole forming a centrifugal governor. It will be evident that when the weights are thrown outwardly by an increase in speed of the engine the shaft 41 will be moved inwardly, and the valve 12—13, will be depressed to lessen the supply of air, and also the supply of fuel.

In operation, the liquid fuel, as for instance, gasolene, is fed to the chamber or groove 30, and a portion thereof passes through the small openings of the ring, and through the perforated shield, and through the slots 17 and 18 to the interior of the valve, the remainder passing out through the pipes 39 and 34. Only a certain proportion passes through into the valve, the amount depending upon the action of the governor, and this amount is mixed with a suitable quantity of air entering through the grooves 11, 14. As the engine increases its speed, the valve is depressed against the resistance of the spring 27, shutting off a part of the fuel, and also a part of the air. It will be evident that by turning the nut 28, the tension of the spring 27 may be regulated, and as a consequence the point at which the cutting off of the mixture will occur. Thus the speed of the engine regulates the feeding of the mixture, and the engine is held to a predetermined speed.

I claim:

1. A carbureter comprising a main casing having at one end an outlet for attachment to an engine, a valve casing arranged within the main casing, said valve casing being reduced at the end remote from the outlet of the main casing, and having the said end closed, the main casing having an annular air chamber encircling the valve casing, and an annular fuel chamber encircling the reduced portion, a substantially cylindrical valve fitting within the valve casing and having a reduced portion fitting within the reduced portion of the valve casing, said valve and valve casing having air inlets normally registering with each other, and registering with the air chamber, and having fuel inlet passages adjacent to the fuel chamber of the main casing and normally registering with each other, a double screen arranged between the fuel chamber and the fuel inlet passages a spring normally holding the valve with the inlet passages in register with the inlet passages of the valve casing, a governor having means for connecting the same with a rotating part of the engine, and a connection between the governor and the valve for moving the said valve longitudinally of the casing against the resistance of the spring to partially close the air and fuel passages, said main casing having an outlet at its lower end for permitting the escape of the excess fuel.

2. A carbureter comprising a valve casing having an outlet for the mixture, a valve fitting within the casing and movable longitudinally thereof, said valve having annular series of air inlets and the casing having annular series of air inlets adapted to register with the inlets of the valve, said valve having an annular series of fuel inlets and the casing having an annular series of fuel inlets adapted to register therewith and on the opposite side of the air inlets from the outlet of the casing, a spring normally holding the valve in position, whereby the inlets thereof register with the inlets of the casing, a governor adapted to be operated by the engine, and a connection between the governor and the valve for moving the said valve against the resistance of the spring, said casing having an annular air chamber encircling the valve adjacent to the air inlets, and having an annular fuel chamber encircling the valve adjacent to the fuel inlets, and a ring encircling the casing between the fuel chamber and the fuel inlets of the valve, said ring having ports, said fuel chamber having an outlet and a valve controlling the outlet.

3. A carbureter comprising a valve casing having an outlet for the mixture. a valve fitting within the casing and movable longitudinally thereof, said valve having annular series of air inlets and the casing having annular series of air inlets adapted to register with the inlets of the valve, said valve having an annular series of fuel inlets and the casing having an annular series of fuel inlets adapted to register therewith and on the opposite side of the air inlets from the outlet of the casing, a spring normally holding the valve in position, whereby the inlets thereof register with the inlets of the casing, a governor adapted to be operated by the engine, a connection between the governor and the valve for moving the said valve against the resistance of the spring, said casing having an annular air chamber encircling the valve adjacent to the air inlets and having an annular fuel chamber encircling the valve adjacent to the fuel inlets, and a ring encircling the casing between the fuel chamber and the fuel inlets of the valve, said ring having ports.

4. A carbureter comprising a valve casing having an outlet for the mixture, a valve fitting within the casing and movable longitudinally thereof, said valve and casing having air inlets, and fuel inlets normally registering with each other, yielding means normally holding the valve in such position that the air and fuel inlets thereof register with the air and fuel inlets of the casing, a governor adapted to be operated by the engine, a connection between the governor and the valve for moving the said valve, the casing having an annular air chamber encircling the valve adjacent to the air inlets, and having an annular fuel chamber encircling the valve adjacent to the fuel inlets, a screen encircling the casing between the fuel chamber and the inlets, and a ring encircling the screen and engaging the outer face thereof, said ring having openings for admitting the fuel to the screen.

WARREN ELKIN.

Witnesses:
 JAS. H. POYNTER,
 ELIAS CURRY.